(12) United States Patent
Shin et al.

(10) Patent No.: US 11,714,325 B2
(45) Date of Patent: *Aug. 1, 2023

(54) DISPLAY DEVICE

(71) Applicant: Samsung Display Co., Ltd., Yongin-Si (KR)

(72) Inventors: Dong Hee Shin, Asan-si (KR); Geun Ho Lee, Hwaseong-si (KR); Yong Hee Lee, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,192

(22) Filed: Aug. 11, 2022

(65) Prior Publication Data

US 2022/0382116 A1 Dec. 1, 2022

Related U.S. Application Data

(63) Continuation of application No. 17/168,226, filed on Feb. 5, 2021, now Pat. No. 11,415,851.

(30) Foreign Application Priority Data

Apr. 14, 2020 (KR) .................. 10-2020-0045304

(51) Int. Cl.
  *G02F 1/1368* (2006.01)
  *G02F 1/1362* (2006.01)
  *G02F 1/1343* (2006.01)

(52) U.S. Cl.
  CPC ...... *G02F 1/136286* (2013.01); *G02F 1/1368* (2013.01); *G02F 1/13624* (2013.01);
  (Continued)

(58) Field of Classification Search
  CPC ......... G02F 1/136286; G02F 1/134309; G02F 1/136213; G02F 1/13624; G02F 1/1368; G02F 2201/123
  See application file for complete search history.

(56) References Cited

U.S. PATENT DOCUMENTS 11,415,851 B2 * 8/2022 Shin ................ G02F 1/136286
2021/0055615 A1 * 2/2021 Cheng ............... G02F 1/136286
2021/0208433 A1 7/2021 Ahn et al.

FOREIGN PATENT DOCUMENTS

KR 10-2012-0110413 A 10/2012
KR 10-2014-0080670 A 7/2014
(Continued)

*Primary Examiner* — James A Dudek
(74) *Attorney, Agent, or Firm* — Innovation Counsel LLP

(57) ABSTRACT

Provided is a display device. The display device comprises: a substrate including a display area having a plurality of pixels and a non-display area, a plurality of data lines connected to each of the plurality of pixels and extending in a first direction, a plurality of first gate lines connected to each of the plurality of pixels and extending in a second direction crossing the first direction, a plurality of second gate lines extending along the first direction from one end of the display area to a line contact portion contacting each of the plurality of first gate lines, and a plurality of off voltage lines extending in a direction opposite to the first direction from the other end of the display area opposite to one end of the display area to a periphery of the line contact portion and insulated from the plurality of second gate lines.

20 Claims, 12 Drawing Sheets

(52) U.S. Cl.
CPC .. *G02F 1/134309* (2013.01); *G02F 1/136213* (2013.01); *G02F 2201/123* (2013.01)

(56) References Cited

FOREIGN PATENT DOCUMENTS

| KR | 10-2017-0033934 A | 3/2017 |
| KR | 10-2004844 B1 | 7/2019 |
| KR | 10-2020938 B1 | 9/2019 |
| KR | 10-2021-0089282 A | 7/2021 |

\* cited by examiner

DISPLAY DEVICE

This application is a continuation application of U.S. patent application Ser. No. 17/168,226 filed on Feb. 5, 2021, which claims priority to Korean Patent Application No. 10-2020-0045304 filed on Apr. 14, 2020, in the Korean Intellectual Property Office, the disclosure of which is incorporated herein by reference in its entirety.

BACKGROUND

1. Field

The present inventive concept relates to a display device.

2. Description of the Related Art

With the development of information society, requirements for display devices for displaying images have increased in various forms. For example, display devices are applied to various electronic devices such as smartphones, digital cameras, notebook computers, navigators, and smart televisions. A display device may be a flat panel display device such as a liquid crystal display device, a field emission display device, or an organic light emitting display device.

A liquid crystal display device includes two substrates facing each other, a pixel electrode, a liquid crystal layer, and a common electrode disposed between the two substrates. Alignment of liquid crystal molecules in the liquid crystal display device is determined by an electric field formed between the pixel electrode and the common electrode and the alignment of the liquid crystal molecules controls the polarization of incident light, thereby displaying an image. Recently, research and development have been conducted on technologies for minimizing a bezel area of a liquid crystal display device.

SUMMARY

Aspects of the present inventive concept are to provide a display device in which a pixel electrode may not be influenced by a kick-back voltage due to a vertical gate line, and occurrence of stains due to luminance variations of a plurality of pixels may be prevented.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to an embodiment of the present disclosure, a display device comprises: a substrate including a display area having a plurality of pixels and a non-display area, a plurality of data lines connected to each of the plurality of pixels and extending in a first direction, a plurality of first gate lines connected to each of the plurality of pixels and extending in a second direction crossing the first direction, a plurality of second gate lines extending along the first direction from one end of the display area to a plurality of line contact portions, each of the plurality of first gate lines and each of the plurality of second gate lines being connected to each other in the plurality of line contact portions, and a plurality of off voltage lines extending in a direction opposite to the first direction from the other end of the display area opposite to the one end of the display area to a periphery of the line contact portion and insulated from the plurality of second gate lines.

The off voltage line may be disposed adjacent to a pixel electrode of a pixel connected to a first gate line which is connected to a second gate line through a line contact portion.

Each of the pixels disposed adjacent to a plurality of off voltage lines among the plurality of pixels may comprise: a pixel electrode, a switching element connected to a corresponding first gate line among the plurality of first gate lines to supply a data voltage to the pixel electrode, and a first capacitor disposed between the pixel electrode and the off voltage line.

The display device may further comprise: a plurality of auxiliary electrodes disposed to overlap the plurality of second gate lines or the plurality of off voltage lines, and a storage electrode disposed between the plurality of auxiliary electrodes. The second gate line disposed on the extension line in the first direction may be spaced apart from the off voltage line with the storage electrode interposed therebetween.

The plurality of auxiliary electrodes and the storage electrode may be formed of a first conductive layer, and the plurality of second gate lines and the plurality of off voltage lines may be formed of a second conductive layer provided on the first conductive layer.

The plurality of auxiliary electrodes may be connected to the plurality of second gate lines or the plurality of off voltage lines through a contact hole provided in a gate insulating film disposed between the first conductive layer and the second conductive layer.

The plurality of second gate lines may have different lengths from each other depending on a position of the line contact portion.

The plurality of second gate lines may sequentially supply gate signals from the longest second gate line to the shortest second gate line.

Each of the plurality of off voltage lines may receive a gate-off voltage turning off a switching element of each of the plurality of pixels.

The plurality of second gate lines may include a plurality of first electrode patterns and a first auxiliary electrode connecting the plurality of first electrode patterns, and the plurality of off voltage lines may include a plurality of second electrode patterns and a second auxiliary electrode connecting the plurality of second electrode patterns.

Among the plurality of first electrode patterns, a part of the first electrode pattern connected to the line contact portion may extend to one side upper portion of the second auxiliary electrode and may be spaced apart from the second electrode pattern in a plan view.

The display device may further comprise: a storage electrode disposed between the plurality of first auxiliary electrodes. Each of the plurality of first electrode patterns may overlap one of the plurality of first gate lines and the storage electrode.

Each of the plurality of second electrode patterns may overlap one of the plurality of first gate lines and the storage electrode.

The first auxiliary electrode and the second auxiliary electrode may be formed of a first conductive layer, and the plurality of first electrode patterns and the plurality of second electrode patterns may be formed of a second conductive layer provided on the first conductive layer.

Each of the plurality of first electrode patterns may be connected to a corresponding first auxiliary electrode through a first contact hole provided in a gate insulating film between the first conductive layer and the second conductive layer and may be connected to an adjacent first auxiliary electrode through a second contact hole provided in the gate insulating film.

Each of the plurality of second electrode patterns may be connected to a corresponding second auxiliary electrode through a third contact hole provided in the gate insulating film and may be connected to an adjacent second auxiliary electrode through a fourth contact hole provided in the gate insulating film.

The line contact portion may be formed through the gate insulating film and may be disposed between the first contact hole and the third contact hole.

The display device may further comprise: a flexible film disposed at one side of the non-display area, and a display driving circuit disposed on the flexible film. The display driving circuit may supply a data voltage to the plurality of data lines and may supply a gate signal to the plurality of second gate lines.

The line contact portion may be disposed on an extension line connecting a lower end of the display area to an upper end of the display area.

The substrate may include a plurality of display areas, and the line contact portion of each of the plurality of display areas may be disposed on an extension line connecting a lower end of a corresponding sub-display area to an upper end of the corresponding sub-display area.

According to the display device of embodiments, the display device may include an off voltage line disposed adjacent to a pixel electrode, thereby forming constant capacitance between the pixel electrode and the off voltage line. Therefore, the display device may prevent luminance from being reduced by a kick-back voltage of a vertical gate line and may prevent the occurrence of stains due to luminance variations of pixels.

The effects of the present inventive concept are not limited by the foregoing, and other various effects are anticipated herein.

BRIEF DESCRIPTION OF THE DRAWINGS

The above and other aspects and features of the present inventive concept will become more apparent by describing in detail embodiments thereof with reference to the attached drawings, in which.

DETAILED DESCRIPTION OF THE EMBODIMENTS

Figure 1:
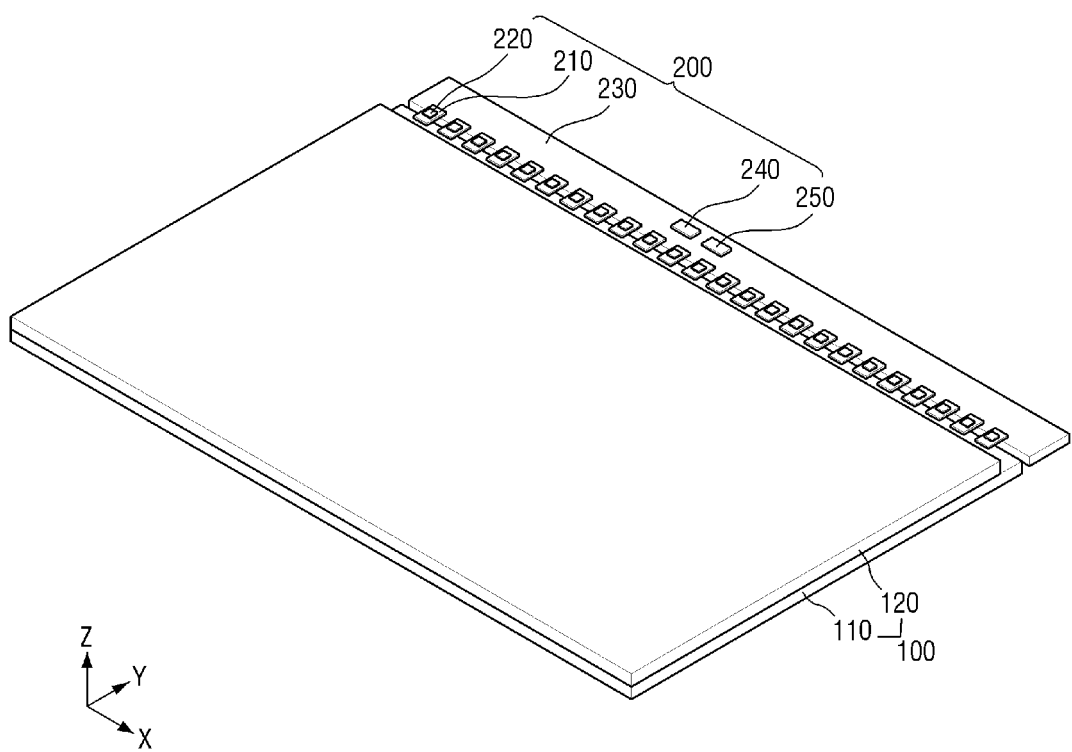
FIG. 1 is a perspective view of a display device according to an embodiment.

In the following description, for the purposes of explanation, numerous specific details are set forth in order to provide a thorough understanding of various embodiments or implementations of the inventive concept. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
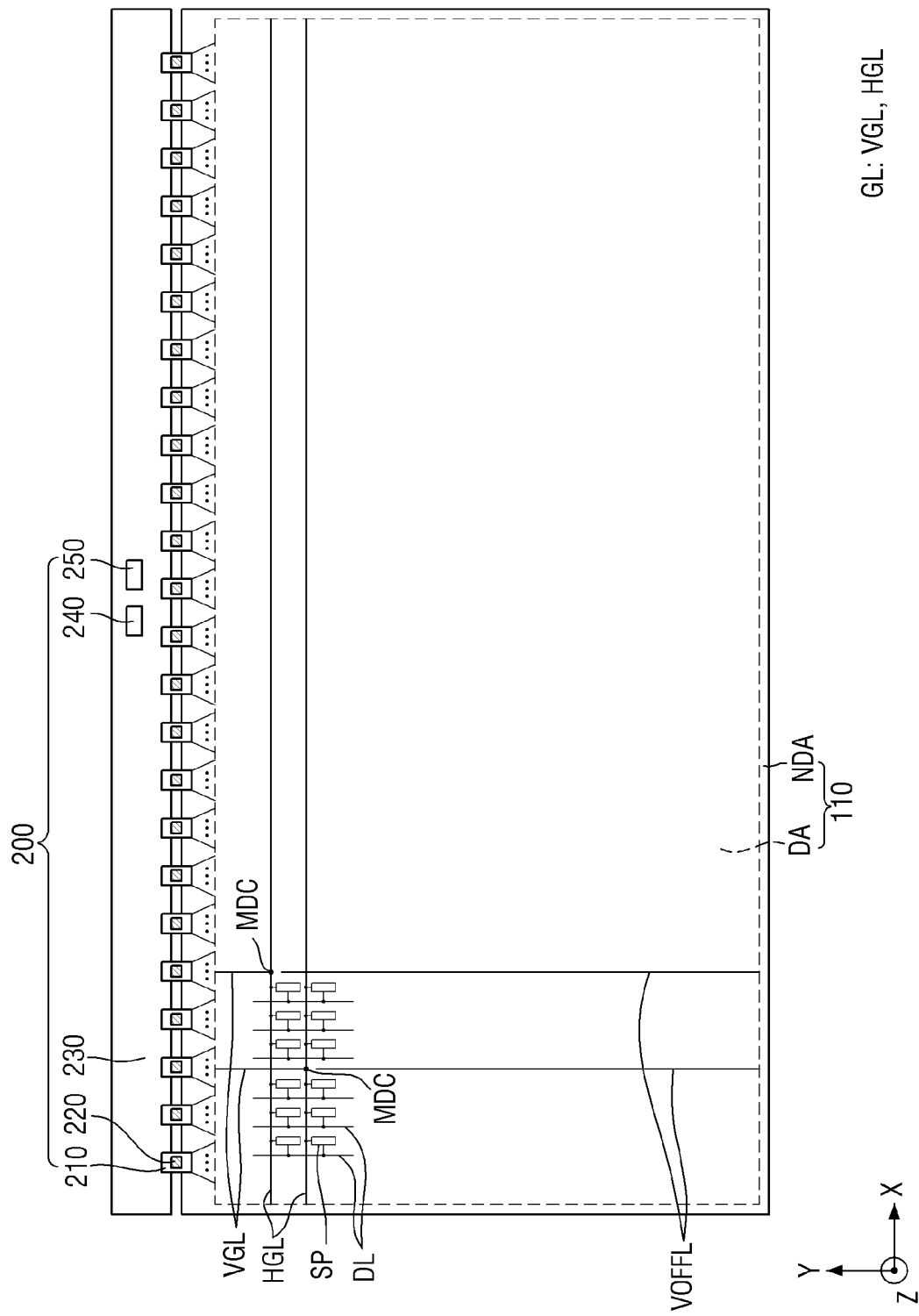
FIG. 2 is a plan view of a display device according to an embodiment.

FIG. 1 is a perspective view of a display device according to an embodiment, and FIG. 2 is a plan view of a display device according to an embodiment.

In this specification, the "on", "over", "top", "upper side", or "upper surface" refers to an upward direction with respect to the display device, that is, a Z-axis direction, 10, and the "beneath", "under", "bottom", "lower side", or "lower surface" refers to a downward direction with respect to the display device 10, that is, a direction opposite to the Z-axis direction. Further, the "left", "right", "upper", and "lower" refer to directions when the display device 10 is viewed from the plane. For example, the "left" refers to a direction opposite to the X-axis direction, the "right" refers to the X-axis direction, the "upper" refers to the Z-axis direction, and the "lower" refers to a direction opposite to the Z-axis direction.

Referring to FIGS. 1 and 2, the display device, which is a device for displaying a moving image or a still image, may be used as a display screen of various products such as televisions, notebooks, monitors, billboards, internet of things (IOTs) as well as portable electronic devices such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

The display device may include a display panel 100 and a display driver 200.

The display panel 100 may have a rectangular shape in a plan view. For example, the display panel 100 may have a rectangular planar shape having short sides in the first direction (Y-axis direction) and long sides in the second direction (X-axis direction). The corner where the short side in the first direction (Y-axis direction) meets the long side in the second direction (X-axis direction) may be formed to have a right angle shape or a round shape having a predetermined curvature. The planar shape of the display panel 100 is not limited to a rectangular shape, and may be formed in another polygonal shape, circular shape, or elliptical shape. For example, the display panel 100 may be formed to be flat, but the configuration of the display panel 100 is not limited thereto. As another example, the display panel 100 may be formed to be bent at a predetermined curvature.

The display panel 100 may include a first substrate 110 and a second substrate 120. The first substrate 110 and the second substrate 120 may be made of glass or plastic. For example, the display panel 100 may be implemented as a liquid crystal display panel including a liquid crystal layer disposed between the first substrate 110 and the second substrate 120.

The length of the first substrate 110 in the second direction (Y-axis direction) may be longer than the length of the second substrate 120 in the second direction (Y-axis direction). For example, a part of the upper surface of the first substrate 110 may be exposed without being covered by the second substrate 120. The exposed upper surface of the first substrate 110 may include pads (not shown) to which the display driver 200 is connected.

The first substrate 110 may include a display area DA and a non-display area NDA.

The display area DA, which is an area for displaying an image, may be disposed in a central area of the first substrate 110. The display area DA may include a plurality of pixels SP disposed on areas defined by a plurality of data lines DL and a plurality of gate lines GL. The plurality of gate lines GL may include a plurality of first gate lines HGL and a plurality of second gate lines VGL. For example, the plurality of first gate lines may be a plurality of horizontal gate lines HGL extending in the first direction (X-axis direction), and the plurality of second gate lines may be a plurality of vertical gate lines VGL connected to a display driving circuit 220 and extending in the second direction (Y-axis direction). Each of the plurality of vertical gate lines VGL may be connected to a corresponding one of the plurality of horizontal gate lines HGL through a line contact portion MDC. Each of the plurality of pixels SP may be connected to at least one horizontal gate line HGL and at least one data line DL. Each of the plurality of pixels SP may be defined as an area of a minimum unit for outputting light.

The plurality of data lines DL may extend in the second direction (Y-axis direction) and may be spaced apart from each other in the first direction (X-axis direction). For example, the plurality of pixels SP arranged along one column may receive data voltages through one data line DL.

The plurality of vertical gate lines VGL may extend in the second direction (Y-axis direction) and may be spaced apart from each other in the first direction (X-axis direction). The plurality of vertical gate lines VGL may be arranged in parallel with the plurality of data lines DL. The plurality of horizontal gate lines HGL may extend in the first direction (X-axis direction) and may be spaced apart from each other in the second direction (Y-axis direction). For example, one vertical gate line VGL may be connected to one horizontal gate line HGL through the line contact portion MDC. The line contact portion MDC may correspond to a portion where a gate insulating film disposed between the one vertical gate line VGL and the one horizontal gate line HGL is removed in an overlapping region of the one vertical gate line VGL and the one horizontal gate line HGL.

For example, one vertical gate line VGL may be connected to one horizontal gate line HGL through a contact hole formed between the one vertical gate line VGL and the one horizontal gate line HGL. In this case, each of the plurality of pixels SP may receive a data voltage from the data line DL disposed at one side. For another example, one vertical gate line VGL may be connected to two horizontal gate lines HGL. In this case, among the plurality of pixels SP, the pixels SP arranged in some rows may receive a data voltage from the data line DL disposed at the left side, and the pixels SP arranged in other rows may receive a data voltage from the data line DL disposed at the right side. Therefore, a connection among the plurality of data lines DL, the plurality of vertical gate lines VGL, the plurality of horizontal gate lines HGL, and the plurality of pixels SP is not limited to the connection shown in FIG. 2. The connection among the plurality of data lines DL, the plurality of vertical gate lines VGL, the plurality of horizontal gate lines HGL, and the plurality of pixels SP may be changed depending on the number and arrangement of the plurality of pixels SP.

The non-display area NDA may be defined as the remaining area of the first substrate 110 except for the display area DA. For example, the non-display area NDA may include fan-out lines connecting the data lines DL or the vertical gate lines VGL with the display driving circuit 220, and pads connected to a flexible film 210.

The display driver 200 may be connected to the pads provided in the non-display area NDA of the first substrate 110 to display an image on the plurality of pixels SP based on image data supplied from a display driving system. The display driver 200 may include a flexible film 210, a display driving circuit 220, a circuit board 230, a timing controller 240, and a power supply 250.

Input terminals provided at one side of the flexible film 210 may be attached to the circuit board 230 by a film attaching process, and output terminals provided at the other side of the flexible film 210 may be attached to the pads of the first substrate 110 by a film attaching process. For example, the flexible film 210 may be a flexible film such as a tape carrier package or a chip on film, which may be bent. The flexible film 210 may be bent toward the lower portion of the first substrate 110 to reduce the bezel area of the display device.

The display driving circuit 220 may be mounted on the flexible film 210. For example, the display driving circuit 220 may be implemented as an integrated circuit (IC). The display driving circuit 220 may receive digital video data and a data control signal from the timing controller 240, convert the digital video data into analog data voltages in response to the data control signal, and transmit the analog data voltages to the data lines DL through the fan-out lines. Further, the display driving circuit 220 may generate gate signals in response to a gate control signal supplied from the timing controller 240 and may sequentially supply the gate signals to the plurality of vertical gate lines VGL.

The circuit board 230 may support the timing controller 240 and the power supply 250 and may transmit signals and power between the components of the display driver 200. For example, the circuit board 230 may supply a signal supplied from the timing controller 240 and driving power supplied from the power supply 250 to the display driving circuit 220 to display an image on each pixel. For this purpose, a signal transmission line and a plurality of power lines may be provided on the circuit board 230.

The timing controller 240 may be mounted on the circuit board 230 and receive image data and a timing synchronization signal supplied from a display driving system through a user connector provided on the circuit board 230. The timing controller 240 may generate digital video data by aligning the image data corresponding to the pixel arrangement structure in response to the timing synchronization signal and may supply the generated digital video data to the corresponding display driving circuit 220. The timing controller 240 may generate a data control signal and a gate control signal in response to the timing synchronization signal. The timing controller 240 may control the data voltage supply timing of the display driving circuit 220 based on the data control signal and may control the gate signal supply timing of the display driving circuit 220 based on the gate control signal.

The power supply 250 may be disposed on the circuit board 230 to supply driving voltages to the display driving circuit 220 and the display panel 100. For example, the power supply 250 may generate a first driving voltage and supply the first driving voltage to each of the plurality of pixels SP arranged on the first substrate 110 and may generate a second driving voltage and supply the second driving voltage to a common electrode disposed on the second substrate 120. The first driving voltage may correspond to a high potential voltage for driving the plurality of pixels SP, and the second driving voltage may correspond to a common voltage commonly supplied to the plurality of pixels SP.

The display device may further include a sealant (not shown) disposed between the first substrate 110 and the second substrate 120. The sealant may surround a liquid crystal layer formed between the first substrate 110 and the second substrate 120. The sealant may be provided along the edge of the display area DA to attach the first substrate 110 and the second substrate 120 to each other. The sealant may seal the liquid crystal layer to prevent the liquid crystal layer from being exposed to the outside of the display area DA.

Figure 3:
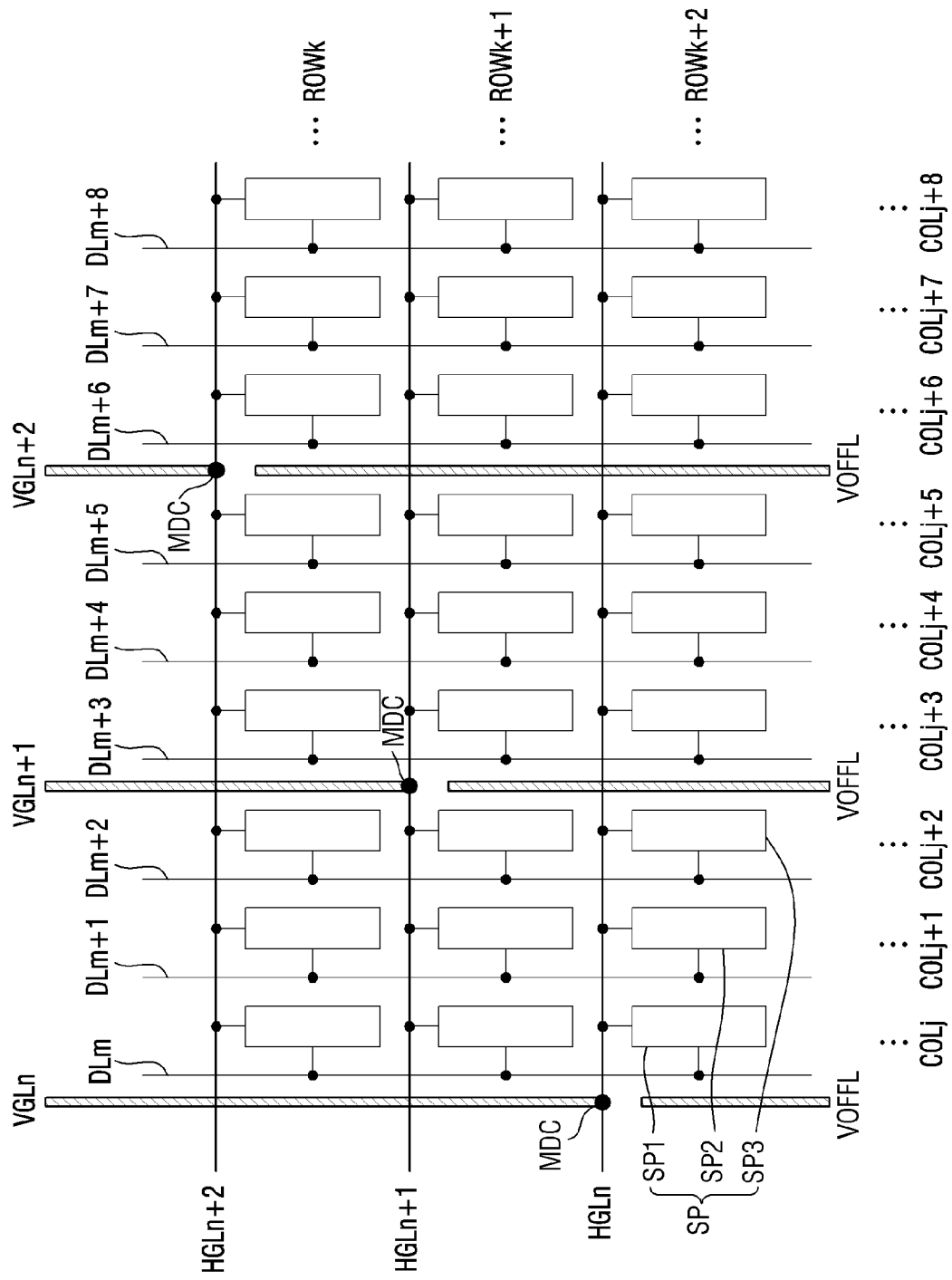
FIG. 3 is a view showing a connection between a plurality of pixels and a plurality of gate lines in the display device according to an embodiment.

FIG. 3 is a view showing a connection between a plurality of pixels and a plurality of gate lines in the display device according to an embodiment.

Referring to FIG. 3, each of the plurality of pixels SP may be connected to at least one data line DL and at least one horizontal gate line HGL.

The m-th to m+8th data lines DLm to DLm+8 (hereinafter, m is a natural number) may extend in the second direction (Y-axis direction) and may be spaced apart from each other in the first direction (X-axis direction). The plurality of pixels SP arranged along one column may receive data voltages through one data line DL. For example, the pixels SP arranged in the j-th column COLj (hereinafter, j is a natural number) may receive data voltages from the m-th data line DLm. Each of the plurality of pixels SP may receive a data voltage from one data line DL and may receive a gate signal from one horizontal gate line HGL, so that each of the plurality of pixels SP may independently express gradation.

The plurality of vertical gate lines VGL and the plurality of off voltage lines VOFFL may be arranged in parallel with the plurality of data lines DL. Each of the plurality of horizontal gate lines HGL may cross the plurality of vertical gate lines VGL. One vertical gate line VGL may be connected to one horizontal gate line HGL. For example, the n-th vertical gate line VGLn (hereinafter, n is a natural number) may be connected to n-th horizontal gate lines HGLn arranged along the k+2th row ROWk+2 (hereinafter, k is a natural number). The n+1th vertical gate line VGLn+1 may be connected to the n+1th horizontal gate lines HGLn+1 arranged along the k+1th row ROWk+1. The vertical gate line VGL may be connected to the horizontal gate line HGL through the line contact portion MDC. The n-th vertical gate line VGL may be insulated from other horizontal gate lines except for the n-th horizontal gate line HGLn among the plurality of horizontal gate lines HGL. The n-th vertical gate lines VGLn connected to the n-th horizontal gate line HGLn, which is connected to k+2th pixel row ROWk+2, through a contact hole may intersect a n+2th horizontal gate line HGLn+2 and a n+1th horizontal gate line HGLn+1, which are connected to previous pixel rows, for example, the k-th pixel row ROWk and the k+1th pixel row ROWk+1, respectively. The n-th vertical gate lines VGLn may be insulated from gate lines except the n-th horizontal gate line HGLn by a gate insulating film disposed between the vertical gate line VGL and the horizontal gate line HGL.

The plurality of vertical gate lines VGL may have different lengths according to the position of the line contact portion MDC. For example, the n-th vertical gate line VGLn may be connected to the n-th horizontal gate line HGLn arranged along the k+2th row ROWk+2, and the n+1th vertical gate line VGLn+1 may be connected to the n+1th horizontal gate line HGLn+1 arranged along the k+1th row ROWk+1. The length of the n-th vertical gate line VGLn may be longer than the length of the n+1th vertical gate line VGLn+1. The plurality of vertical gate lines VGL may sequentially supply gate signals to the horizontal gate lines HGL from the longest vertical gate line VGL to the shortest vertical gate line VGL. Accordingly, each of the plurality of vertical gate lines VGL may not affect a kick-back voltage to the pixels SP disposed in pixel rows connected to subsequent horizontal gate lines to the horizontal gate line to which the vertical gate line is connected through the line contact portion MDC.

Each of the plurality of vertical gate lines VGL may traverse a part of the display area DA and the off voltage line VOFFL may traverse another part of the display area DA which the each of the plurality of vertical gate lines VGL do not traverse. The off voltage line VOFFL may be formed of the same material, formed through the same process as the plurality of vertical gate lines VGL and be insulated from the vertical gate line VGL. The length of the off voltage line VOFFL may decrease as the length of the corresponding vertical gate line VGL increases. For example, the length of the off voltage line VOFFL corresponding to the n-th vertical gate line VGLn may be shorter than the length of the off voltage line VOFFL corresponding to the n+1th vertical gate line VGLn+1.

Optionally, the display panel 100 may further include a compensation pattern (not shown) that compensates for the resistance of the vertical gate line VGL. For example, the plurality of vertical gate lines VGL may have different lengths depending on the position of the line contact portion MDC and may have different line resistance values depending on the position of the line contact portion MDC. Accordingly, the display panel 100 may include a compensation pattern corresponding to each of the plurality of vertical gate lines VGL to eliminate differences in line resistance values of the plurality of vertical gate lines VGL.

For another example, the display driving circuit 220 may supply a gate signal compensating for the line resistance value of each of the plurality of vertical gate lines VGL to the plurality of vertical gate lines VGL. Accordingly, each of the plurality of vertical gate lines VGL may supply the same gate signal to the corresponding horizontal gate line HGL.

The plurality of pixels SP may include first to third sub-pixels SP1, SP2, and SP3. The first to third sub-pixels SP1, SP2, and SP3 may be repeatedly arranged along the horizontal gate line HGL. For example, the first to third sub-pixels SP1, SP2, and SP3 may constitute one pixel, and the one pixel may be disposed between two vertical gate lines VGL.

The first substrate 110 may include a plurality of off voltage lines VOFFL. The plurality of off voltage lines VOFFL may extend in the second direction (Y-axis direction) and may be spaced apart from each other in the first direction (X-axis direction). Each of the plurality of off voltage lines VOFFL and the plurality of vertical gate lines VGL disposed on the same column may have the same width and extend along the same direction. The each of the plurality of vertical gate lines VGL may extend to overlap the horizontal gate lines HGL to which the each of the plurality of vertical gate lines VGL are connected. The plurality of off voltage lines VOFFL may be arranged in parallel with the data line DL or the vertical gate lines VGL. The plurality of off voltage lines VOFFL may be disposed in the same space as the plurality of vertical gate lines VGL in the second direction, respectively. For example, the plurality of vertical gate lines VGL may extend from one end of the display area DA to the line contact portion MDC along a direction opposite to the second direction (Y-axis direction), and the plurality of off voltage lines VOFFL may extend from the other end of the display area DA opposite to the one end of the display area DA toward the line contact portion MDC along the second direction (Y-axis direction). The plurality of off voltage lines VOFFL may not be electrically connected to the plurality of vertical gate lines VGL. The plurality of off voltage lines VOFFL may be spaced apart a predetermined distance from the plurality of vertical gate lines VGL disposed in the same columnar space, respectively. Each of the plurality of vertical gate lines VGL may be connected to the corresponding horizontal gate line HGL by the line contact portion MDC, and the off-voltage line VOFFL may be terminated at the periphery of the line contact portion MDC and insulated from the vertical gate line VGL.

The off voltage line VOFFL may be disposed adjacent to the pixel electrode of the adjacent first pixel SP1 or third pixel SP3. The off voltage line VOFFL adjacent to the line contact portion MDC may be disposed adjacent to the pixel electrode of the pixel SP having a switching element adjacent to the line contact portion MDC. For example, the switching element of the first sub-pixel SP1 disposed in the k+2th row ROWk+2 and the j-th column COLj may be disposed adjacent to the line contact portion MDC and may receive a gate signal from the n-th horizontal gate line HGLn connected to the line contact portion MDC. The pixel electrode of the first sub-pixel SP1 disposed in the k+2th row ROWk+2 and the j-th column COLj may be disposed adjacent to the off voltage line VOFFL, and a capacitance may be formed between the pixel electrode of the first sub-pixel SP1 and the off voltage line VOFFL. Here, the off voltage line VOFFL may have a gate off voltage turning off switching elements of the plurality of pixels SP. Accordingly, the off-voltage line VOFFL and the pixel electrode of the first sub-pixel SP1 may form a constant capacitance, thereby preventing the influence of a kick-back voltage due to a voltage change in the vertical gate line VGL and preventing the occurrence of stains due to the luminance variations of a plurality of pixels.

Figure 4:
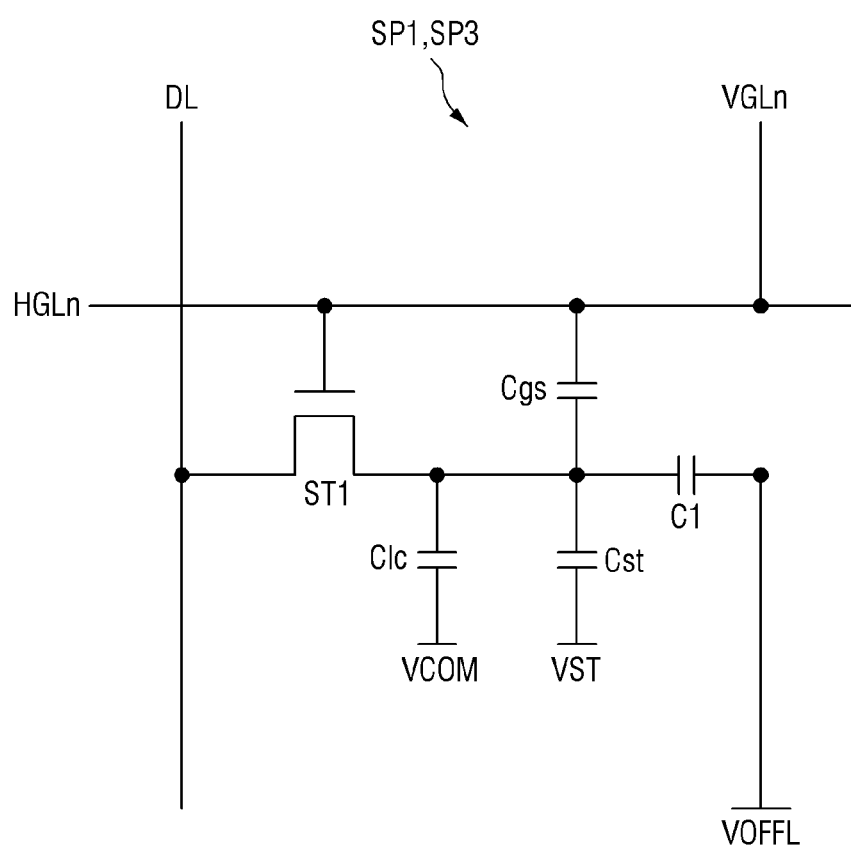
FIG. 4 is a circuit diagram showing a pixel circuit of a first sub-pixel and a third sub-pixel in the display device according to an embodiment.

FIG. 4 is a circuit diagram showing a pixel circuit of a first sub-pixel and a third sub-pixel in the display device according to an embodiment.

Referring to FIG. 4, the first sub-pixel SP1 or the third sub-pixel SP3 may include a switching element ST1 and a pixel electrode. The first sub-pixel SP1 or the third sub-pixel SP3 may further include a liquid crystal capacitor Clc formed between the pixel electrode and the common electrode, a storage capacitor Cst formed between the source electrode of the switching element ST1 and the storage electrode STE, a first capacitor C1 formed between the pixel electrode and the off voltage line VOFFL, and a gate-source capacitor Cgs formed between the source electrode and the gate electrode of the switching element ST1. Hereinafter, the first capacitor C1 may have a first capacitance.

The switching element ST1 may be connected to the n-th horizontal gate line HGLn and the data line DL. For example, the switching element ST1 may include a gate electrode connected to the n-th horizontal gate line HGLn, a drain electrode DE connected to the data line DL, and a source electrode SE connected to the pixel electrode. Here, each of the drain electrode DE and the source electrode SE may be referred to as a first electrode or a second electrode of the switching element. The switching element ST1 may be turned on in response to a gate signal to supply a data voltage to the pixel electrode.

One electrode of the liquid crystal capacitor Clc may be formed of the pixel electrode and the other electrode of the liquid crystal capacitor Clc may be formed of the common electrode disposed on the second substrate 120. The pixel electrode may receive a data voltage, and the common electrode may receive a common voltage VCOM. The liquid crystal capacitor Clc may charge a voltage difference between the pixel electrode and the common electrode. The liquid crystal layer may be disposed between the pixel electrode and the common electrode, and the arrangement of liquid crystal molecules in the liquid crystal layer may be changed depending on a voltage difference between the pixel electrode and the common electrode, thereby changing the transmittance of light passing through the liquid crystal layer.

One end of the storage capacitor Cst may be formed of the source electrode of the switching element ST1, and the other end of the storage capacitor Cst may be formed of the storage electrode. When the switching element ST1 is turned on, the source electrode of the switching element ST may receive a data voltage, and the storage electrode may receive a storage voltage VST. For example, the storage electrode may receive a specific voltage, but the present inventive concept is not necessarily limited thereto. The storage capacitor Cst may charge a voltage difference between the source electrode and the storage electrode of the switching element ST1.

For example, when the n-th horizontal gate line HGLn supplies a gate-on voltage, the switching element ST1 may be turned on, and the data line DL may supply a data voltage to the pixel electrode. The storage capacitor Cst may charge a data voltage and supply the charged data voltage to the liquid crystal capacitor Clc for one frame period. Accordingly, the liquid crystal capacitor Clc may maintain a constant potential difference by the storage capacitor Cst, and the liquid crystal layer may maintain a constant arrangement of liquid crystal molecules to transmit light.

One electrode of the first capacitor C1 may be formed of the pixel electrode and the other electrode of the first capacitor C1 may be formed of the off voltage line VOFFL. For example, when the switching element of the first sub-pixel SP1 is disposed adjacent to the line contact portion MDC to which the n-th vertical gate line VGLn and the n-th horizontal gate line HGLn are connected, the n-th vertical gate line VGLn may be terminated at the line contact portion MDC, and the off voltage line VOFFL may be disposed along the extending direction of the n-th vertical gate line VGLn while being spaced apart from the n-th vertical gate line VGLn. Accordingly, the off voltage line VOFFL may be disposed adjacent to the pixel electrode of the first sub-pixel SP1, and the first capacitor C1 may be formed between the pixel electrode of the first pixel SP and the off voltage line VOFFL. One electrode of the first capacitor C1 may be a pixel electrode receiving a data voltage, and the other electrode of the first capacitor C1 may be an off voltage line VOFFL having a gate off voltage. Therefore, the first capacitance may be formed between the pixel electrode and the off voltage line VOFFL.

Since the off-voltage line VOFFL may have a constant gate-off voltage while the plurality of gate lines GL sequentially supply gate signals, the first capacitance of the first capacitor C1 may not be influenced by a kick-back voltage. Accordingly, the off-voltage line VOFFL may maintain the first capacitance between the pixel electrode of the first sub-pixel SP1 and the off voltage line VOFFL, thereby preventing the occurrence of stains due to luminance variations of the plurality of pixels SP.

One electrode of the gate-source capacitor Cgs may be formed of the gate electrode of the switching element ST1, and the other electrode of the gate-source capacitor Cgs may be formed of the source electrode of the switching element ST. For example, one electrode of the gate-source capacitor Cgs may correspond to a part of the n-th horizontal gate line HGLn, and the other electrode of the gate-source capacitor Cgs may be the source electrode of the switching element ST1 overlapping the n-th horizontal gate line HGLn. Therefore, the second capacitance can be formed between the gate electrode and the source electrode of the switching element ST.

Figure 5:
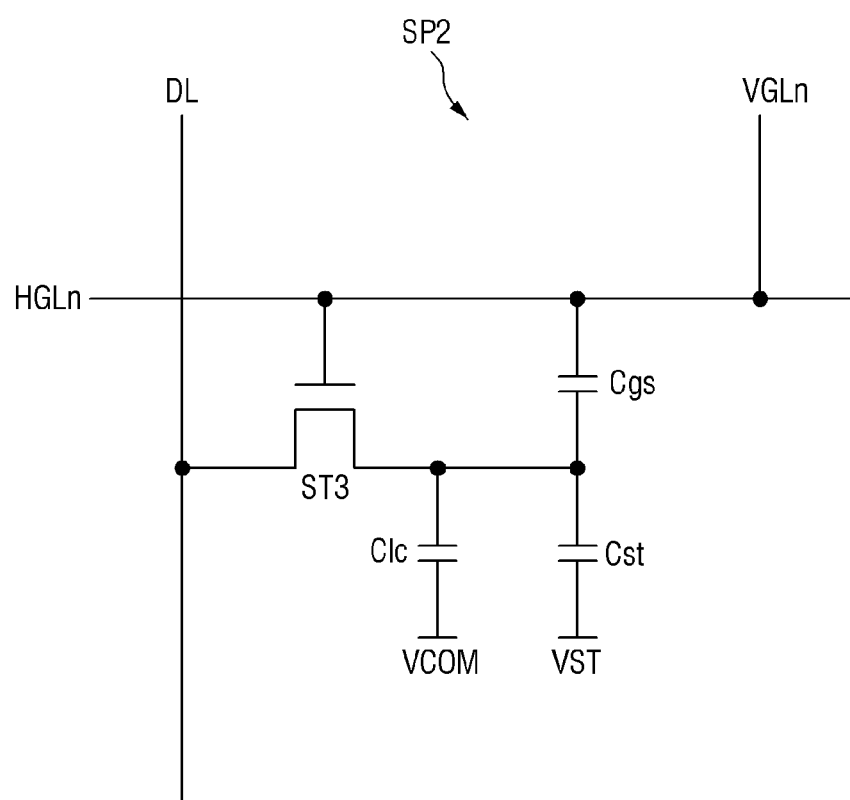
FIG. 5 is a circuit diagram showing a pixel circuit of a second sub-pixel in the display device according to an embodiment.

FIG. 5 is a circuit diagram showing a pixel circuit of a second pixel in the display device according to an embodiment.

Referring to FIG. 5, the pixel circuit of the second sub-pixel SP2 may include a switching element ST3 and a pixel electrode. The second sub-pixel SP2 may further include a liquid crystal capacitor Clc formed between the pixel electrode and the common electrode, a storage capacitor Cst formed between the source electrode of the switching element ST3 and the storage electrode STE, and a gate-source capacitor Cgs formed between the source electrode and the gate electrode of the switching element ST3.

The switching element ST3 may be connected to the n-th horizontal gate line HGLn and the data line DL. For example, the switching element ST3 may include a gate electrode connected to the n-th horizontal gate line HGLn, a drain electrode DE connected to the data line DL, and a source electrode SE connected to the pixel electrode. The switching element ST3 may be turned on in response to a gate signal to supply a data voltage to the pixel electrode.

One electrode of the liquid crystal capacitor Clc may be formed of the pixel electrode, and the other electrode of the liquid crystal capacitor Clc may be formed of the common electrode disposed on the second substrate 120. The pixel electrode may receive a data voltage, and the common electrode may receive a common voltage VCOM. The liquid crystal capacitor Clc may charge a voltage difference between the pixel electrode and the common electrode. The liquid crystal layer may be disposed between the pixel electrode and the common electrode, and the arrangement of liquid crystal molecules in the liquid crystal layer may be changed depending on a voltage difference between the pixel electrode and the common electrode, thereby changing the transmittance of light passing through the liquid crystal layer.

One electrode of the storage capacitor Cst may be formed of the source electrode of the switching element ST3 and the other electrode of the storage capacitor Cst may be formed of the storage electrode STE. When the switching element ST3 is turned on, the source electrode of the switching element ST3 may receive a data voltage, and the storage electrode may receive a storage voltage VST. For example, the storage electrode STE may receive a specific voltage, but the present inventive concept is not necessarily limited thereto. The storage capacitor Cst may charge a voltage difference between the source electrode of the switching element ST and the storage electrode STE.

For example, when the n-th horizontal gate line HGLn supplies a gate-on voltage, the switching element ST3 may be turned on, and the data line DL may supply a data voltage to the pixel electrode. The storage capacitor Cst may charge a data voltage and supply the charged data voltage to the liquid crystal capacitor Clc for one frame period. Accordingly, the liquid crystal capacitor Clc may maintain a constant potential difference by the storage capacitor Cst, and the liquid crystal layer may maintain a constant arrangement of liquid crystal molecules to transmit light.

One electrode of the gate-source capacitor Cgs may be formed of the gate electrode of the switching element ST3, and the other electrode of the gate-source capacitor Cgs may be formed of the source electrode of the switching element ST3. For example, one end of the gate-source capacitor Cgs may correspond to a part of the n-th horizontal gate line HGLn, and the other end of the gate-source capacitor Cgs may be the source electrode of the switching element ST3 overlapping the n-th horizontal gate line HGLn.

Figure 6:
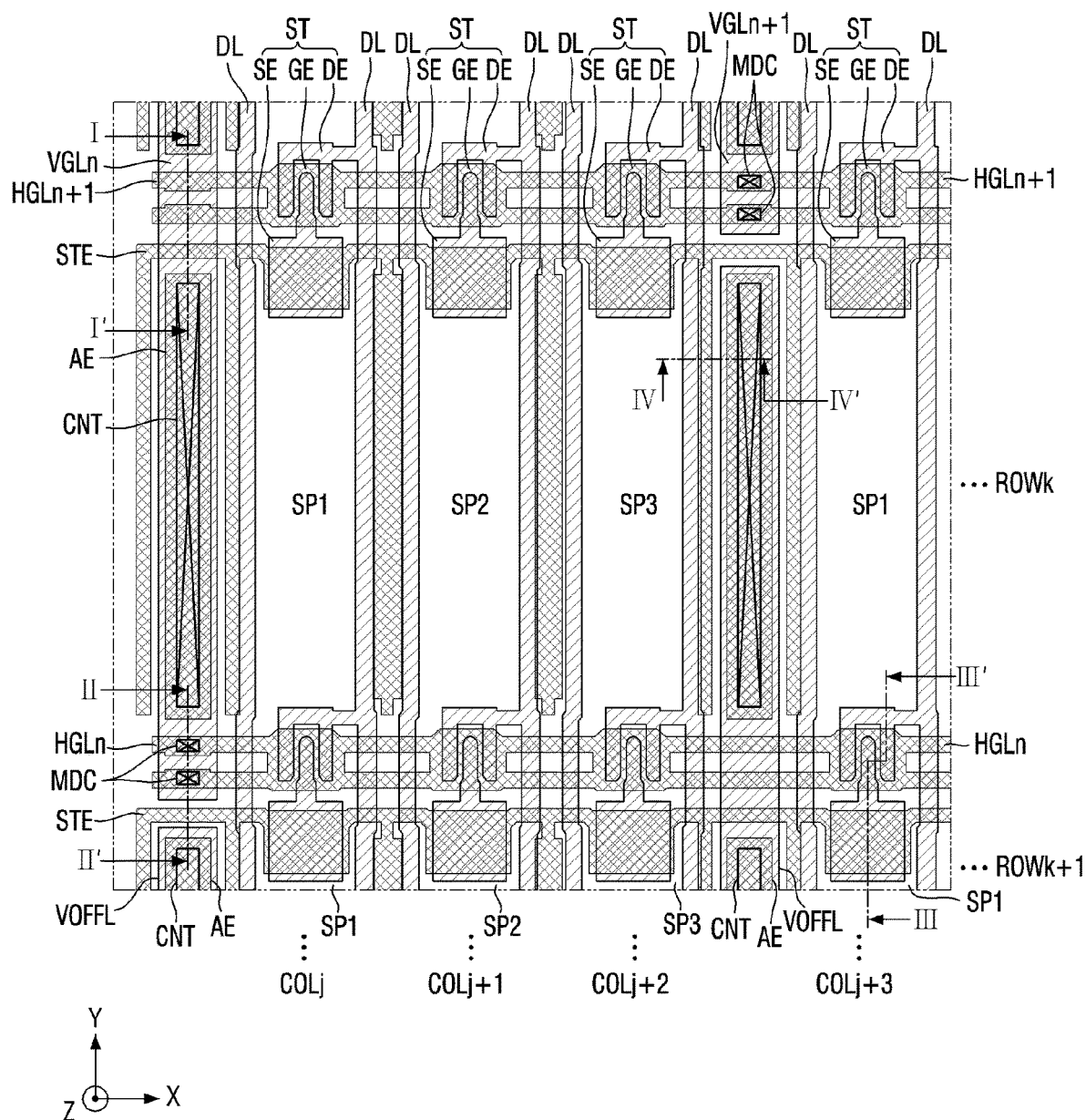
FIG. 6 is a plan view showing a plurality of pixels in the display device according to an embodiment.
Figure 7:
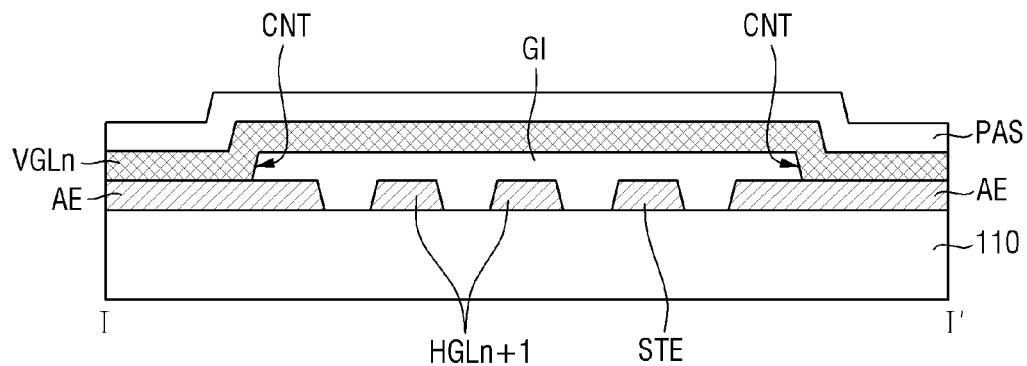
FIG. 7 is a cross-sectional view taken along the line I-I' of FIG. 6.
Figure 8:
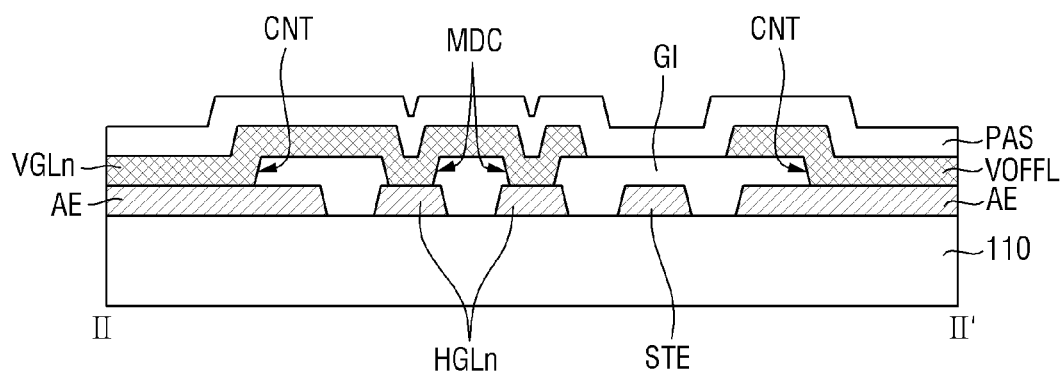
FIG. 8 is a cross-sectional view taken along the line II-IF of FIG. 6.
Figure 9:
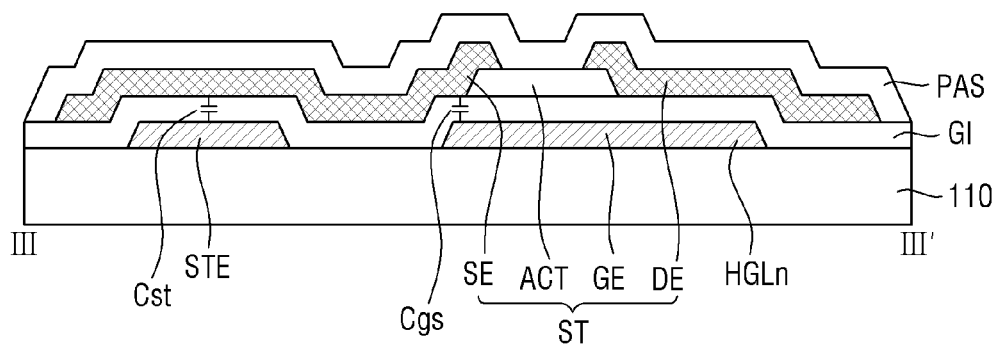
FIG. 9 is a cross-sectional view taken along the line of FIG. 6.
Figure 10:
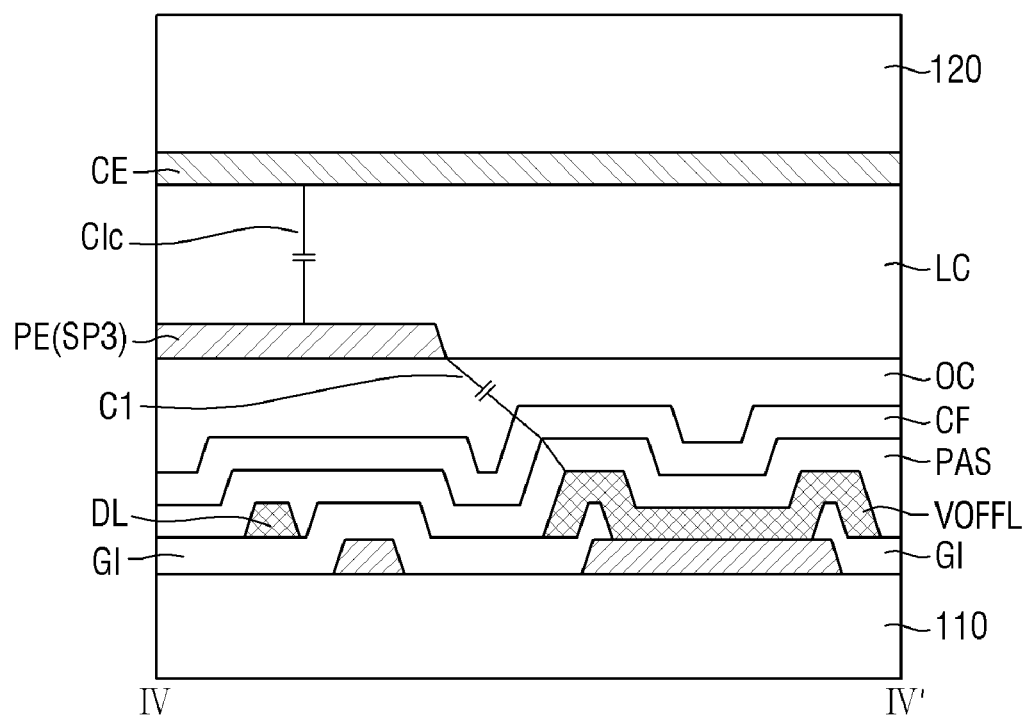
FIG. 10 is a cross-sectional view taken along the line IV-IV' of FIG. 6.

FIG. 6 is a plan view showing a plurality of pixels in the display device according to an embodiment, FIG. 7 is a cross-sectional view taken along the line I-I' of FIG. 6, FIG. 8 is a cross-sectional view taken along the line II-IF of FIG. 6, FIG. 9 is a cross-sectional view taken along the line of FIG. 6, and FIG. 10 is a cross-sectional view taken along the line IV-IV' of FIG. 6.

Referring to FIGS. 6 to 10, the display panel 100 may include a first substrate 110, an n-th horizontal gate line HGLn, an n+1th horizontal gate line HGLn+1, a storage electrode STE, an auxiliary electrode AE, a gate insulating film GI, a plurality of data lines DL, an n-th vertical gate line VGLn, an n+1th vertical gate line VGLn+1, an off voltage line VOFFL, a passivation layer PAS, and first to third sub-pixels SP1, SP2, and SP3.

The n-th horizontal gate line HGLn, the n+1th horizontal gate line HGLn+1, the storage electrode STE, and the auxiliary electrode AE may be formed of a first conductive layer, and the plurality of data lines DL, the n-th vertical gate line VGLn, the n+1th vertical gate line VGLn+1, and the off voltage line VOFFL may be formed of a second conductive layer provided on the first conductive layer.

The n-th horizontal gate line HGLn may be disposed on the first substrate 110. The n-th horizontal gate line HGLn may be connected to the n-th vertical gate line VGLn through a line contact portion MDC. The line contact portion MDC may correspond to a portion where the gate insulating film GI is removed in an overlapping area of the vertical gate line VGL and the horizontal gate line HGL. The n-th horizontal gate line HGLn may be insulated from other vertical gate lines except for the n-th vertical gate line VGLn among the plurality of vertical gate lines VGL.

The storage electrode STE may be disposed on the first substrate 110. The storage electrode STE may receive a storage voltage VST. A part of the storage electrode STE may be disposed in parallel with the horizontal gate line HGL. A part of the storage electrode STE may be disposed between the horizontal gate line HGL and the auxiliary electrode AE. For example, the storage electrode may receive a specific voltage, but the present inventive concept is not necessarily limited thereto. The storage electrode STE and the source electrode SE of the switching element ST may form a storage capacitor Cst.

The auxiliary electrode AE may be disposed on the first substrate 110 to overlap the vertical gate line VGL and/or the off voltage line VOFFL. The auxiliary electrode AE may be connected to the vertical gate line VGL or the off voltage line VOFFL through a contact hole CNT. At least three surfaces of the auxiliary electrode AE may be surrounded by the storage electrode STE in a plan view. Each of the plurality of vertical gate lines VGL may be connected to the corresponding horizontal gate line HGL, and the entire length of the gate line GL may increase. Therefore, the auxiliary electrode AE may be in contact with each of the plurality of vertical gate lines VGL, thereby reducing the resistance of the plurality of vertical gate lines VGL.

The gate insulating film GI may cover the n-th horizontal gate line HGLn, the n+1th horizontal gate line HGLn+1, the storage electrode STE, and the auxiliary electrode AE. For example, the gate insulating film GI may include an inorganic insulating material such as a silicon compound or a metal oxide. The gate insulating film GI may be a single-layer film or a multi-layer film formed of different materials from each other.

The plurality of data lines DL may be disposed on the gate insulating film GI. The plurality of data lines DL may extend in the second direction (Y-axis direction) and may be spaced apart from each other in the first direction (X-axis direction). For example, the plurality of pixels SP arranged along one column may receive data voltages through one data line DL. Each of the plurality of data lines DL may supply a data voltage to a drain electrode DE1 of the switching element ST.

Each of the n-th vertical gate line VGLn and the n+1th vertical gate line VGLn+1 may be disposed on the gate insulating film GI. The n-th vertical gate line VGLn and the n+1th vertical gate line VGLn+1 may extend in the second direction (Y-axis direction) and may be spaced apart from each other in the first direction (X-axis direction). For example, the n-th vertical gate line VGLn may be connected to the n-th horizontal gate line HGLn through the line contact portion MDC, and the n+1th vertical gate line VGLn+1 may be insulated from the n-th horizontal gate line HGLn.

The off voltage line VOFFL may be disposed on the gate insulating film GI. Each of the plurality of off voltage lines VOFFL and the plurality of vertical gate lines VGL disposed on the same column may have the same width and extend along the same direction. The each of the plurality of vertical gate lines VGL may extend to overlap the horizontal gate line HGL to which the each of the plurality of vertical gate lines VGL are connected. Each of the plurality of vertical gate lines VGL may be connected to the horizontal gate line HGL by the line contact portion MDC, and the off voltage line VOFFL may be terminated at the periphery of the line contact portion MDC and insulated from the vertical gate line VGL. For example, the off voltage line VOFFL and the n-th vertical gate line VGLn connected to the line contact portion MDC may be spaced apart from each other with the storage electrode STE interposed therebetween. Referring to FIGS. 6 and 10, the off voltage line VOFFL may be disposed adjacent to the pixel electrode PE of the adjacent first sub-pixel SP1 or third sub-pixel SP3. Accordingly, the first capacitor C1 may be formed between the off voltage line VOFFL and the pixel electrode PE of the first sub-pixel SP1 or third sub-pixel SP3 adjacent to the off voltage line VOFFL.

The passivation layer PAS may cover the plurality of data lines DL, the n-th vertical gate line VGLn, the n+1th vertical gate line VGLn+1, and the first and third switching elements ST1 and ST3. For example, the passivation layer PAS may be made of an organic material, and may protect the plurality of data lines DL, the n-th vertical gate line VGLn, the n+1th vertical gate line VGLn+1, and the first and third switching elements ST1 and ST3.

The switching element ST of each of the first and third switching elements ST1 and ST3 may include a gate electrode GE, an active region ACT, a drain electrode DE, and a source electrode SE. Referring to FIGS. 6 and 9, the gate electrode GE of the first sub-pixel SP1 is a part of the n-th horizontal gate line HGLn and may correspond to a region overlapping the active region ACT. The active region ACT of the first sub-pixel SP1 may be disposed on the gate insulating film GI. The drain electrode DE of the first sub-pixel SP1 may cover one end of the active region ACT, and the source electrode SE thereof may cover the other end of the active region ACT. The drain electrode DE of the first sub-pixel SP1 may be connected to the data line DL to receive a data voltage. The source electrode SE of the first sub-pixel SP1 may be connected to the pixel electrode PE and may receive a data voltage when the switching element ST is turned on. The switching element ST of the first sub-pixel SP1 may be connected to the n-th horizontal gate line HGL and may receive a gate-on voltage from the n-th horizontal gate line HGLn when the n-th vertical gate line VGLn supplies a gate-on voltage.

In FIG. 9, the gate electrode GE of the switching element ST may correspond to one electrode of the gate-source capacitor Cgs and the source electrode SE of the switching element ST may correspond to the other electrode of the gate-source capacitor Cgs. For example, one electrode of the gate-source capacitor Cgs of the first sub-pixel SP1 may correspond to a part of the n-th horizontal gate line HGLn and the other electrode of the gate-source capacitor Cgs may correspond to the source electrode SE of the switching element ST overlapping the n-th horizontal gate line HGLn. Therefore, the capacitance of the gate-source capacitor Cgs may be formed between the gate electrode GE and the source electrode SE of the switching element ST.

In FIG. 10, the display panel 100 may further include a color filter CF, a planarization layer OC, a liquid crystal layer LC, a common electrode CE, and a second substrate 120.

The third sub-pixel SP3 may include a switching element ST and a pixel electrode PE connected to a source electrode SE of the switching element ST. For example, the third sub-pixel SP3 may receive a gate-on voltage from the n+1th horizontal gate line HGLn+1, and the off voltage line VOFFL adjacent to the third sub-pixel SP3 may have a gate-off voltage. In this case, the first capacitor C1 may be formed between the pixel electrode PE of the third sub-pixel SP3 and the off voltage line VOFFL having a gate off voltage. Accordingly, while the third sub-pixel SP3 receives a gate-on voltage from the n+1th horizontal gate line HGLn+1, the off voltage line VOFFL may have a constant gate-off voltage, and the first capacitance C1 between the pixel electrode PE of the third sub-pixel SP3 and the off voltage line VOFFL may be maintained constant. Therefore, the display device may include the off voltage line VOFFL adjacent to the pixel electrode PE and disposed on the extension line of the vertical gate line VGL, thereby maintaining the first capacitance constant to prevent the reduction in luminance due to a kick-back voltage.

The color filter CF may be disposed to overlap the pixel electrode PE on the passivation layer PAS. The color filter CF may provide a specific color to light transmitting the display panel 100. The color filter CF may include first to third color filters that transmit different colors from each other. The first color filter may overlap the pixel electrode PE of the first sub-pixel SP1, the second color filter may overlap the pixel electrode PE of the second sub-pixel SP2, and the third color filter may overlap the pixel electrode PE of the third sub-pixel SP3. For example, each of the first to third color filters may be one of a red color filter, a green color filter, and a blue color filter.

The planarization layer OC may cover the color filter CF and may planarize the upper surface of the first substrate 110.

The pixel electrode PE of each of the first to third sub-pixels SP1, SP2, and SP3 may be disposed on the planarization layer OC. The pixel electrode PE of each of the first to third sub-pixels SP1, SP2, and SP3 may be connected to the source electrode SE of the switching element of each of the first to third sub-pixels SP1, SP2, and SP3. The pixel electrode PE may face the common electrode CE which is disposed on the second substrate 120.

The liquid crystal layer LC may be formed between the first substrate 110 and the second substrate 120. The liquid crystal layer LC may be disposed between the pixel electrode PE and the common electrode CE. The liquid crystal capacitor Clc may be formed between the pixel electrode PE and the common electrode CE to maintain a voltage difference between the pixel electrode PE and the common electrode CE. Therefore, the arrangement of liquid crystal molecules in the liquid crystal layer LC may be changed depending on the voltage difference between the pixel electrode PE and the common electrode CE, thereby changing the transmittance of light passing through the liquid crystal layer LC.

The common electrode CE may be disposed on the second substrate 120. When the second substrate 120 is attached to the first substrate 110, the common electrode CE on the second substrate 120 may face the pixel electrode PE on the first substrate 110.

Figure 11:
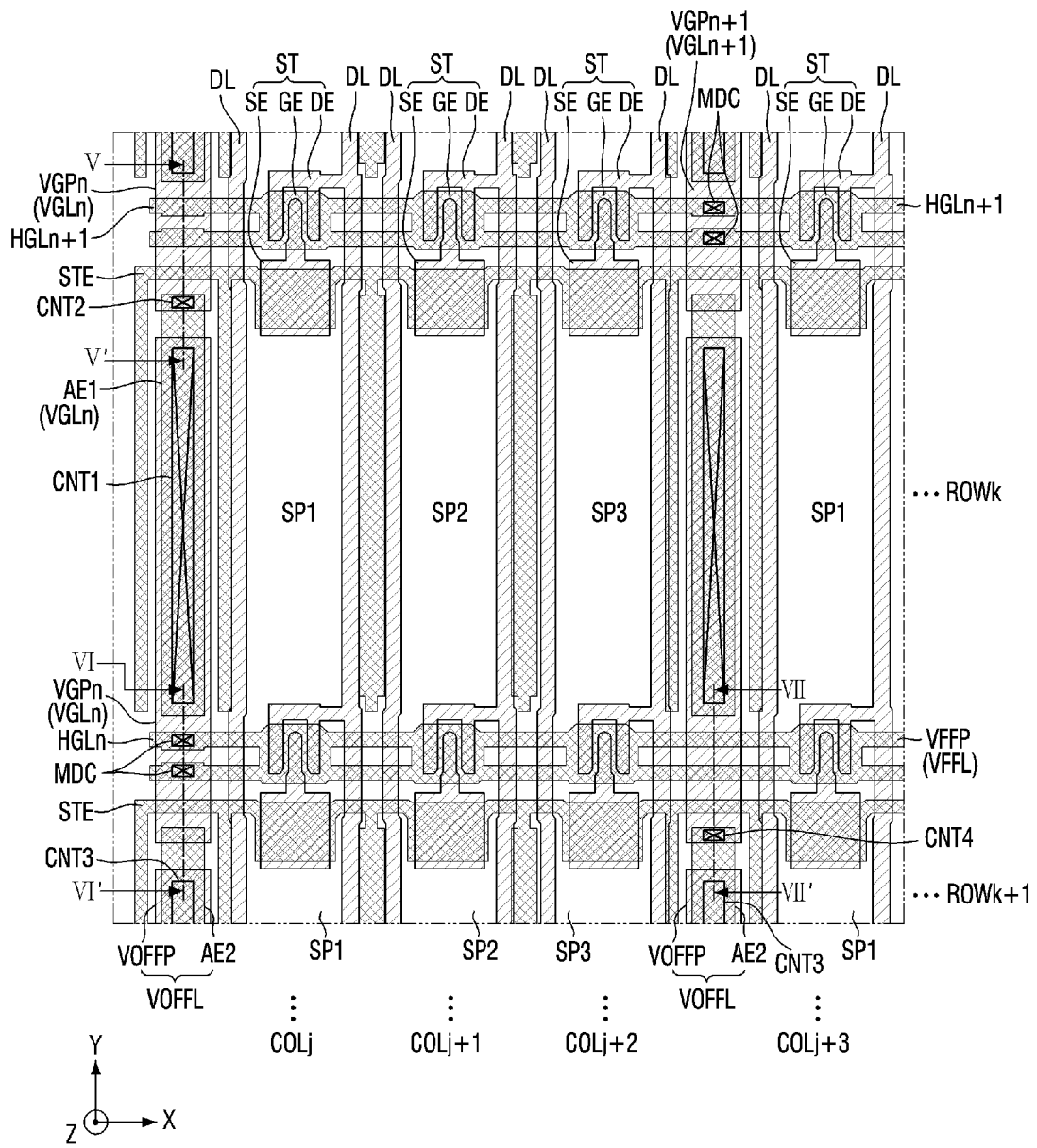
FIG. 11 is a plan view showing a plurality of pixels in a display device according to another embodiment.
Figure 12:
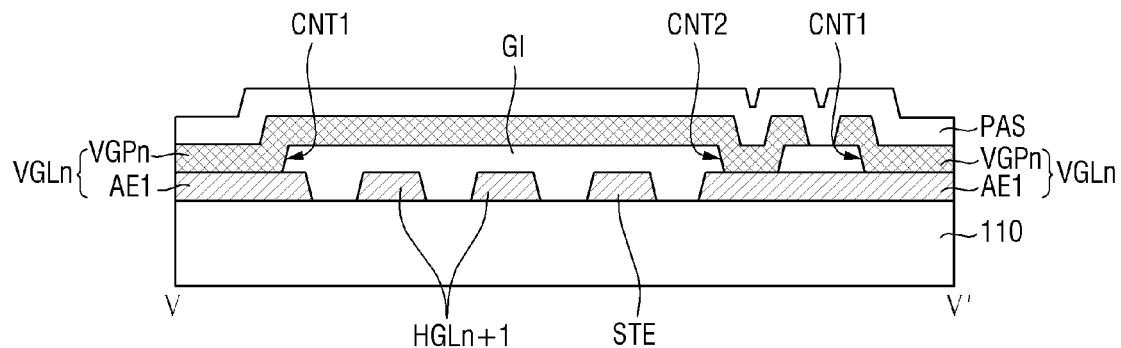
FIG. 12 is a cross-sectional view taken along the line V-V' of FIG. 11.
Figure 13:
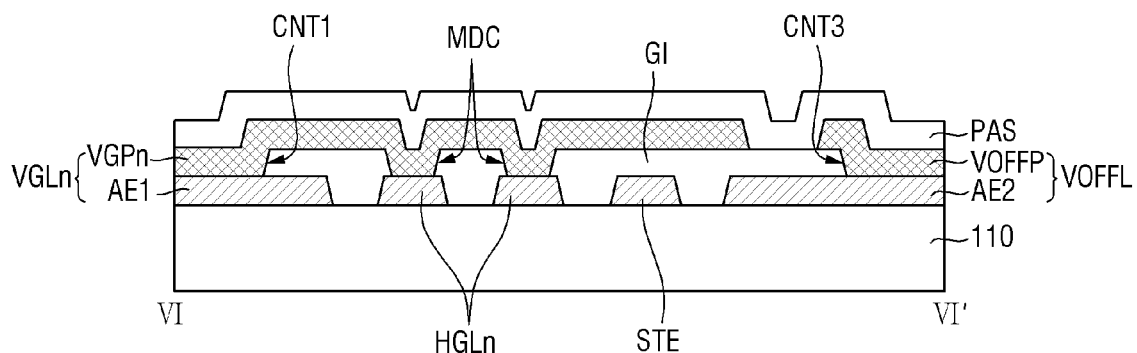
FIG. 13 is a cross-sectional view taken along the line VI-VI' of FIG. 11.
Figure 14:
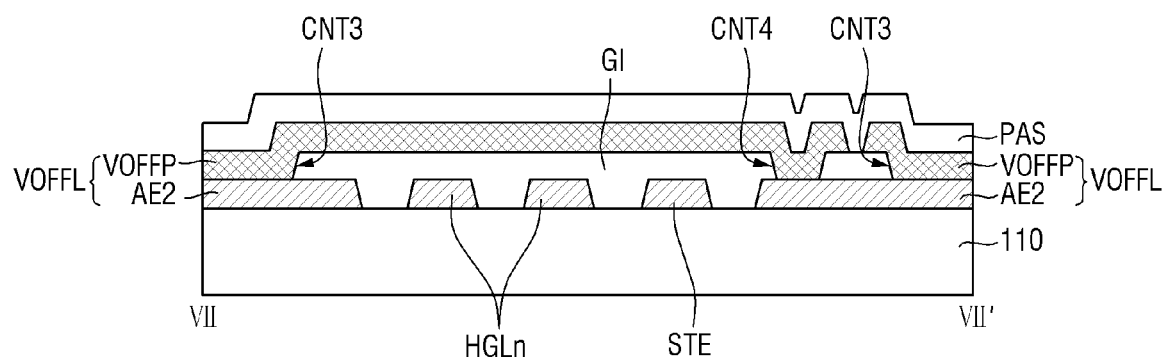
FIG. 14 is a cross-sectional view taken along the line VII-VII' of FIG. 11.

FIG. 11 is a plan view showing a plurality of pixels in a display device according to another embodiment, and FIG. 12 is a cross-sectional view taken along the line V-V' of FIG. 11. FIG. 13 is a cross-sectional view taken along the line VI-VI' of FIG. 11, and FIG. 14 is a cross-sectional view taken along the line VII-VII' of FIG. 11. The display device of FIGS. 11 to 14 is different from the display device of FIGS. 6 to 10 in the configuration of the vertical gate line VGL and the off voltage line VOFFL. The same components as those described above will be briefly described or omitted.

Referring to FIGS. 11 to 14, the display panel 100 may include a first substrate 110, an n-th horizontal gate line HGLn, an n+1th horizontal gate line HGLn+1, a storage electrode STE, a gate insulating film GI, a plurality of data lines DL, an n-th vertical gate line VGLn, an n+1th vertical gate line VGLn+1, an off voltage line VOFFL, a passivation layer PAS, and first to third sub-pixels SP1, SP2, and SP3.

The n-th vertical gate line VGLn may include a plurality of first electrode patterns VGPn and a plurality of first auxiliary electrodes AE1, and the n+1th vertical gate line VGLn+1 may include a plurality of first electrode patterns VGPn+1 and a plurality of first auxiliary electrodes AE1. The first auxiliary electrode AE1 may be disposed in a first conductive layer on the first substrate 110, and the first electrode patterns VGPn and VGPn+1 of each of the n-th vertical gate line VGLn and the n+1 vertical gate line VGLn+1 may be disposed in a second conductive layer on the gate insulating film GI.

The off voltage line VOFFL may include a plurality of second electrode patterns VOFFP and a plurality of second auxiliary electrodes AE2. The second auxiliary electrode AE2 may be disposed in the first conductive layer on the first substrate 110, and the second electrode pattern VOFFP may be disposed in the second conductive layer on the gate insulating film GI.

Referring to FIGS. 11 and 12, the plurality of first electrode patterns VGPn of the n-th vertical gate line VGLn may be arranged in the second direction (Y-axis direction), and the plurality of first auxiliary electrodes AE1 connected to the plurality of first electrode patterns VGPn may be arranged in the second direction (Y-axis direction). The first electrode pattern VGPn may overlap the first auxiliary electrode AE1 corresponding to the first electrode pattern VGPn and may be connected to the first auxiliary electrode AE1 through a first contact hole CNT1 provided in the gate insulating film GI. The first electrode pattern VGPn may extend along a direction opposite to the second direction (Y-axis direction), and may extend to the first auxiliary electrode AE1 disposed in the next row to cross the n+1th horizontal gate line HGLn+1 and the storage electrode STE. Each of the plurality of first electrode patterns VGPn may correspond to each of a plurality of rows. The first electrode pattern VGPn disposed in the previous row may extend to one side upper portion of the first auxiliary electrode AE1 disposed in the next row and may be spaced apart from the first electrode pattern VGPn disposed in the next row on the first auxiliary electrode AE1. The first electrode pattern VGPn disposed in the previous row may be connected to the first auxiliary electrode AE1 disposed in the next row through the second contact hole CNT2, and the first auxiliary electrode AE1 disposed in the next row may be connected to the corresponding first electrode pattern VGPn through the first contact hole CNT1. In this way, the plurality of first electrode patterns VGPn and the plurality of first auxiliary electrodes AE1 may form one n-th vertical gate line VGLn.

Referring to FIGS. 11 and 13, the first electrode pattern VGPn disposed at the end of the n-th vertical gate line VGLn may be connected to the line contact portion MDC, and may extend to the second auxiliary electrode AE2 disposed in the next row to cross the n-th horizontal gate line HGLn and the storage electrode STE. The first electrode pattern VGPn may be spaced apart from the second electrode pattern VOFFP on one side upper portion of the second auxiliary electrode AE2. Further, the lower end of the first electrode pattern VGPn may partially overlap the upper end of the second auxiliary electrode AE2, but the first electrode pattern VGPn and the second auxiliary electrode AE2 may be insulated from each other by the gate insulating film GI. The n-th vertical gate line VGLn may be terminated at the line contact portion MDC, and the off voltage line VOFFL may be insulated from the n-th vertical gate line VGLn while being terminated at the periphery of the line contact portion MDC. The line contact portion MDC may be disposed between the first contact hole CNT1 and the third contact hole CNT3. Therefore, the pixel electrode PE of the first sub-pixel SP1 may be disposed adjacent to the off voltage line VOFFL, and the first capacitor C1 may be formed between the pixel electrode PE of the first sub-pixel SP1 and the off voltage line VOFFL. The off voltage line VOFFL may form a constant capacitance between the pixel electrode PE of the first sub-pixel SP1 and the off voltage line VOFFL to prevent the influence of a kick-back voltage due to the vertical gate line VGL and to prevent the occurrence of stains due to luminance variations of the plurality of pixels SP.

Referring to FIGS. 11 and 14, the plurality of second electrode patterns VOFFP may be arranged in the second direction (Y-axis direction), and the plurality of second auxiliary electrodes AE2 connected to the plurality of second electrode patterns VOFFP may be arranged in the second direction (Y-axis direction). The second electrode pattern VOFFP may overlap the second auxiliary electrode AE2 corresponding to the second electrode pattern VOFFP and may be connected to the second auxiliary electrode AE2 through a third contact hole CNT3 provided in the gate insulating film GI. The second electrode pattern VOFFP may extend along a direction opposite to the second direction (Y-axis direction), and may extend to the second auxiliary electrode AE2 disposed in the next row via the n-th horizontal gate line HGLn and the storage electrode STE. Each of the plurality of second electrode patterns VOFFP may correspond to each of a plurality of rows. The second electrode pattern VOFFP disposed in the previous row may extend to one upper portion of the second auxiliary electrode AE2 disposed in the next row and may be spaced apart from the second electrode pattern VOFFP disposed in the next row on the second auxiliary electrode AE2. The second electrode pattern VOFFP disposed in the previous row may be connected to the second auxiliary electrode AE2 disposed in the next row through a fourth contact hole CNT4, and the second auxiliary electrode AE2 disposed in the next row may be connected to the corresponding second electrode pattern VOFFP through the third contact hole CNT3. In this way, the plurality of second electrode patterns VOFFP and the plurality of second auxiliary electrodes AE2 may form one off voltage line VOFFL.

Figure 15:
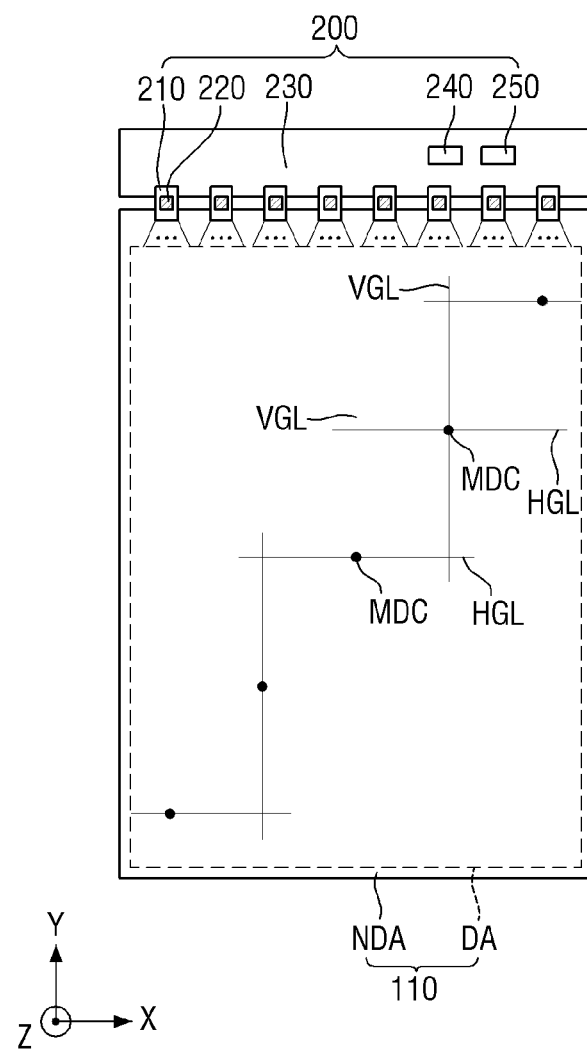
FIG. 15 is a plan view showing a configuration of a line contact portion in the display device according to an embodiment.

FIG. 15 is a plan view showing a configuration of a line contact portion in the display device according to an embodiment.

Referring to FIG. 15, each of the plurality of vertical gate lines VGL may be connected to the corresponding horizontal gate line HGL at the line contact portion MDC. The line contact portion MDC may be disposed on an extension line connecting a lower end of the display area DA to an upper end of the display area DA.

For example, the vertical gate line VGL extending along the left side of the display area DA may be connected to the horizontal gate line HGL extending along the lower side of the display area DA through the line contact portion MDC disposed at the left lower end of the display area DA. The vertical gate line VGL extending along the right side of the display area DA may be connected to the horizontal gate line HGL extending along the upper side of the display area DA through the line contact portion MDC disposed at the right upper end of the display area DA. These line contact portions MDC may be formed through one mask process.

Figure 16:
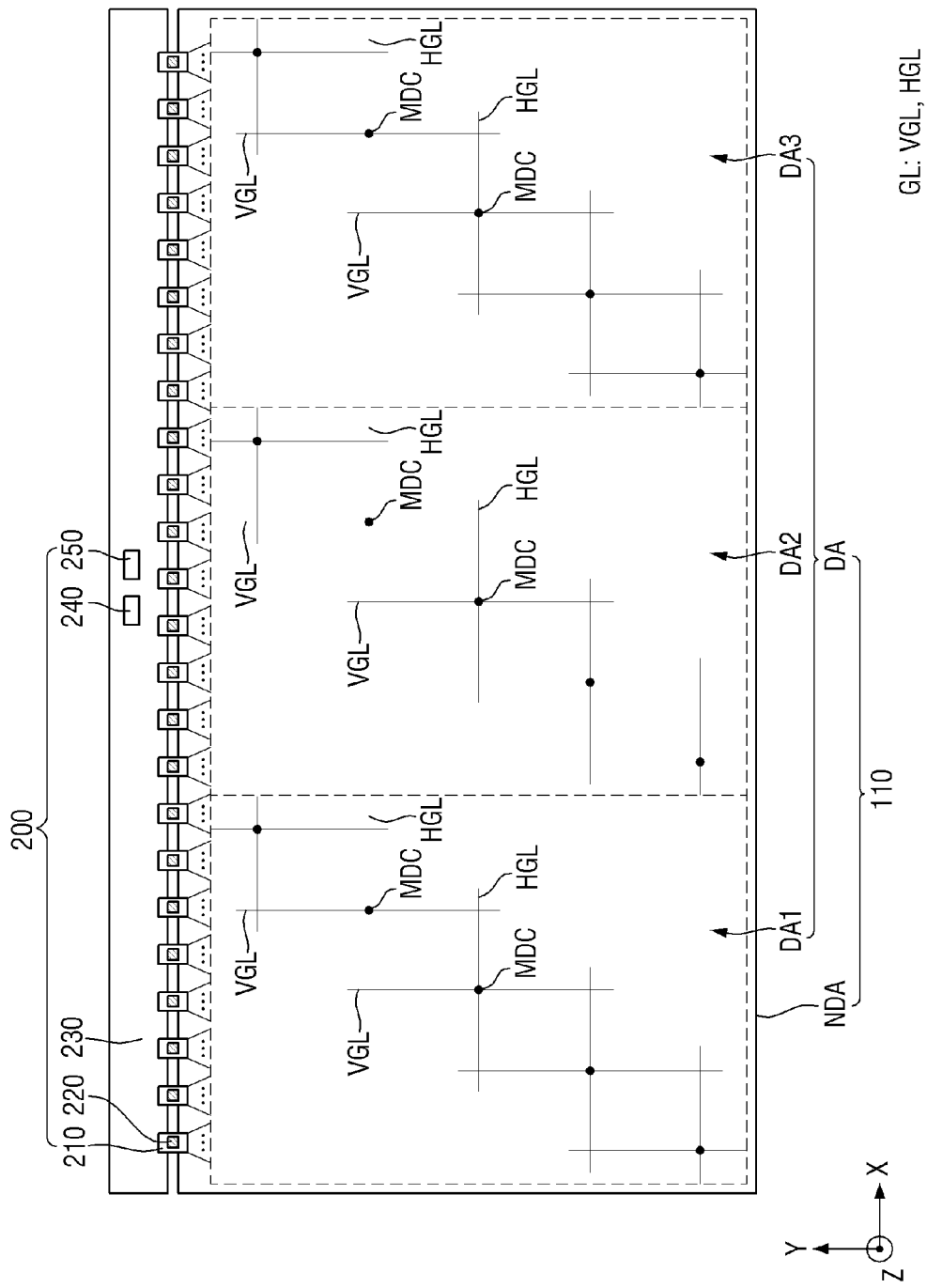
FIG. 16 is a plan view showing a configuration of a line contact portion in the display device according to another embodiment.

FIG. 16 is a plan view showing a configuration of a line contact portion MDC in the display device according to another embodiment.

Referring to FIG. 16, the substrate 110 may include first to third display areas DA1, DA2, and DA3. The line contact portion MDC of the first display area DA1 may be disposed on an extension line connecting a lower end of the first display area DA1 to an upper end of the first display area DA1. The line contact portion MDC of the second display area DA2 may be disposed on an extension line connecting a lower end of the second display area DA2 to an upper end of the second display area DA2. The line contact portion MDC of the third display area DA3 may be disposed on an extension line connecting a lower end of the third display area DA3 to an upper end of the third display area DA3.

For example, the vertical gate line VGL extending along the left side of the first display area DA1 may be connected to the horizontal gate line HGL extending along the lower side of the first display area DA1 through the line contact portion MDC disposed at the left lower end of the first display area DA1. The vertical gate line VGL extending along the right side of the first display area DA1 may be connected to the horizontal gate line HGL extending along the upper side of the first display area DA1 through the line contact portion MDC disposed at the right upper end of the first display area DA1. Accordingly, in each of the first to third display areas DA1, DA2, and DA3, the line contact portion MDC may be formed using the corresponding mask. Consequently, in the display device, without being limited to the size of the display device, line contact portions MDC may be formed in the plurality of display areas DA using a mask.

Although the preferred embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:
1. A display device, comprising:
 a substrate including a display area having a plurality of pixels and a non-display area;
 a plurality of data lines connected to the plurality of pixels and extending in a first direction;
 a plurality of first gate lines connected to the plurality of pixels and extending in a second direction crossing the first direction;
 a plurality of second gate lines extending along the first direction from one end of the display area to a plurality of line contact portions, each of the plurality of first gate lines being connected to a corresponding second gate line of the plurality of second gate lines in a corresponding line contact portion of the plurality of line contact portions;
 a plurality of voltage lines extending in a direction opposite to the first direction from the other end of the display area opposite to the one end of the display area to a periphery of the line contact portion and insulated from the plurality of second gate lines; and
 a storage electrode disposed between at least one of the second gate lines and at least one of the voltage lines.
2. The display device of claim 1, wherein at least one of the pixels comprises:
 a pixel electrode;

a switching element connected to a corresponding first gate line among the plurality of first gate lines to supply a data voltage to the pixel electrode; and a first capacitor disposed between the pixel electrode and the voltage line.

3. The display device of claim 1, further comprising a plurality of auxiliary electrodes disposed to overlap the plurality of second gate lines or the plurality of voltage lines.

4. The display device of claim 3, wherein the storage electrode is disposed between the plurality of auxiliary electrodes.

5. The display device of claim 3, wherein the plurality of auxiliary electrodes and the storage electrode are formed of a first conductive layer provided on the substrate, and the plurality of second gate lines and the plurality of voltage lines are formed of a second conductive layer provided on the first conductive layer.

6. The display device of claim 5, wherein the plurality of auxiliary electrodes are connected to the plurality of second gate lines or the plurality of voltage lines through a contact hole provided in a gate insulating film disposed between the first conductive layer and the second conductive layer.

7. The display device of claim 1, wherein the plurality of second gate lines have different lengths from each other depending on a position of the line contact portion.

8. The display device of claim 1, wherein the plurality of second gate lines sequentially supply gate signals from the longest second gate line to the shortest second gate line.

9. The display device of claim 1, wherein each of the plurality of voltage lines receives a gate-off voltage turning off a switching element of each of the plurality of pixels.

10. The display device of claim 1, further comprising a flexible film disposed at one side of the non-display area and a display driving circuit disposed on the flexible film,
wherein the display driving circuit supplies a data voltage to the plurality of data lines and supplies a gate signal to the plurality of second gate lines.

11. The display device of claim 1, wherein the line contact portion is disposed on an extension line connecting a lower end of the display area to an upper end of the display area.

12. The display device of claim 1, wherein the substrate includes a plurality of display areas, and the line contact portion of each of the plurality of display areas is disposed on an extension line connecting a lower end of a corresponding sub-display area to an upper end of the corresponding sub-display area.

13. A display device, comprising:
a substrate including a display area having a plurality of pixels and a non-display area;
a plurality of data lines connected to the plurality of pixels and extending in a first direction;
a plurality of first gate lines connected to the plurality of pixels and extending in a second direction crossing the first direction;
a plurality of second gate lines extending along the first direction from one end of the display area to a plurality of line contact portions, each of the plurality of first gate lines being connected to a corresponding second gate line of the plurality of second gate lines in a corresponding line contact portion of the plurality of line contact portions; and
a plurality of voltage lines extending in a direction opposite to the first direction from the other end of the display area opposite to the one end of the display area to a periphery of the line contact portion and insulated from the plurality of second gate lines,
wherein the plurality of second gate lines include a plurality of first electrode patterns and a first auxiliary electrode connecting the plurality of first electrode patterns, and the plurality of voltage lines include a plurality of second electrode patterns and a second auxiliary electrode connecting the plurality of second electrode patterns.

14. The display device of claim 13, wherein, among the plurality of first electrode patterns, a part of the first electrode pattern connected to the line contact portion extends to one side upper portion of the second auxiliary electrode and is spaced apart from the second electrode pattern in a plan view.

15. The display device of claim 13, further comprising: a storage electrode disposed between the plurality of first auxiliary electrodes,
wherein each of the plurality of first electrode patterns overlaps one of the plurality of first gate lines and the storage electrode.

16. The display device of claim 15, wherein each of the plurality of second electrode patterns overlaps one of the plurality of first gate lines and the storage electrode.

17. The display device of claim 13, wherein the first auxiliary electrode and the second auxiliary electrode are formed of a first conductive layer, and the plurality of first electrode patterns and the plurality of second electrode patterns are formed of a second conductive layer provided on the first conductive layer.

18. The display device of claim 17, wherein each of the plurality of first electrode patterns is connected to a corresponding first auxiliary electrode through a first contact hole provided in a gate insulating film between the first conductive layer and the second conductive layer and is connected to an adjacent first auxiliary electrode through a second contact hole provided in the gate insulating film.

19. The display device of claim 18, wherein each of the plurality of second electrode patterns is connected to a corresponding second auxiliary electrode through a third contact hole provided in the gate insulating film and is connected to an adjacent second auxiliary electrode through a fourth contact hole provided in the gate insulating film.

20. The display device of claim 19, wherein the line contact portion is formed through the gate insulating film and is disposed between the first contact hole and the third contact hole.

* * * * *